(12) United States Patent
Patch et al.

(10) Patent No.: US 10,197,465 B2
(45) Date of Patent: Feb. 5, 2019

(54) O-RING INTERNAL SEAL FOR PRESSURE SENSOR

(71) Applicant: Honeywell International Inc., Morris Plains, NJ (US)

(72) Inventors: Jason Dennis Patch, Columbus, OH (US); Ian Bentley, New Ipswich, NH (US); Jim Cook, Columbus, OH (US); Todd Eckhardt, Westerville, OH (US)

(73) Assignee: Honeywell International Inc., Morris Plains, NJ (US)

( * ) Notice: Subject to any disclaimer, the term of this patent is extended or adjusted under 35 U.S.C. 154(b) by 17 days.

(21) Appl. No.: 15/404,799

(22) Filed: Jan. 12, 2017

(65) Prior Publication Data

US 2018/0195924 A1    Jul. 12, 2018

(51) Int. Cl.
| | |
|---|---|
| *G01L 19/14* | (2006.01) |
| *F16J 15/02* | (2006.01) |
| *G01L 13/02* | (2006.01) |
| *G01L 19/00* | (2006.01) |

(52) U.S. Cl.
CPC ........... *G01L 19/147* (2013.01); *F16J 15/022* (2013.01); *G01L 13/025* (2013.01); *G01L 19/0038* (2013.01); *G01L 19/143* (2013.01); *G01L 19/144* (2013.01)

(58) Field of Classification Search
CPC .................................................... G01L 19/147
USPC ........................................................... 73/756
See application file for complete search history.

(56) References Cited

U.S. PATENT DOCUMENTS

| | | | | |
|---|---|---|---|---|
| 4,073,191 A | * | 2/1978 | Saigusa ................. | G01L 9/0072 361/283.3 |
| 4,288,835 A | * | 9/1981 | Lee ........................ | G01L 9/0086 361/272 |
| 5,094,109 A | * | 3/1992 | Dean ...................... | G01L 9/0072 361/283.4 |
| 5,349,491 A | * | 9/1994 | Obermeier ............ | G01L 9/0075 361/283.4 |
| 5,890,569 A | * | 4/1999 | Goepfert ................ | G01C 21/16 188/378 |
| 7,143,651 B2 | * | 12/2006 | Sasaki ................... | G01D 11/245 73/721 |
| 7,162,927 B1 | * | 1/2007 | Selvan ................. | G01L 19/0084 73/706 |
| 7,387,040 B2 | * | 6/2008 | Eaton ....................... | G12B 9/08 29/450 |
| 8,684,964 B2 | * | 4/2014 | Stevens ........... | A61M 25/10182 604/99.01 |

(Continued)

FOREIGN PATENT DOCUMENTS

GB           2371674 A     7/2002

*Primary Examiner* — Lisa Caputo
*Assistant Examiner* — Jamel Williams
(74) *Attorney, Agent, or Firm* — Seager, Tufte & Wickhem LLP

(57) ABSTRACT

Systems and methods for sensing pressure, and protecting a sensor within a sensor assembly. A sensor assembly may comprise a sensor having at least one pressure input port; a first housing configured to encapsulate the sensor; a second housing configured to attach to the first housing to encapsulate the sensor; a first O-ring located between the first housing and the sensor; a second O-ring located between the second housing and the sensor; and a printed circuit board configured to receive detected pressure information from the sensor.

20 Claims, 4 Drawing Sheets

(56) References Cited

U.S. PATENT DOCUMENTS

| | | | |
|---|---|---|---|
| 2002/0124655 A1* | 9/2002 | Babala | B60T 8/3675 73/715 |
| 2009/0120196 A1* | 5/2009 | Eckhardt | G01L 19/0007 73/756 |
| 2011/0107839 A1* | 5/2011 | Teli | G01L 19/0038 73/706 |

* cited by examiner

O-RING INTERNAL SEAL FOR PRESSURE SENSOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Sensors are commonly used to sense environmental parameters such as pressure, temperature, humidity, flow, thermal conductivity, gas concentration, light, magnetic fields, electric fields, as well as many other environmental parameters. Such sensors are used in a wide variety of applications including, for example, medical applications, flight control applications, industrial process applications, combustion control applications, weather monitoring applications, water metering applications, as well as many other applications.

SUMMARY

In an embodiment, a sensor assembly may comprise a sensor having at least one pressure input port; a first housing configured to encapsulate the sensor; a second housing configured to attach to the first housing to encapsulate the sensor; a first O-ring located between the first housing and the sensor; a second O-ring located between the second housing and the sensor; and a printed circuit board configured to receive detected pressure information from the sensor.

In an embodiment, a method for assembling a pressure sensor, the method comprising providing a sensor comprising at least one input port for detecting pressure; placing the sensor within a first housing, wherein the first housing comprises a first O-ring, and wherein the sensor contacts the first O-ring; attaching a second housing to the first housing, thereby encapsulating the sensor, wherein the second housing comprises a second O-ring, and wherein the sensor contacts the second O-ring; and directing a pressure to be detected toward the at least one input port via a fluid channel, wherein the fluid channel to the input port passes through at least one of the first O-ring and the second O-ring.

In an embodiment, a sensor assembly may comprise a sensor having at least one pressure input port; at least one housing configured to encapsulate the sensor; a first O-ring configured to be compressed between the housing and the sensor; a second O-ring configured to be compressed between the housing and the sensor, wherein the sensor floats between the first O-ring and the second O-ring; and at least one fluid channel passing through the housing to the at least one pressure input port, wherein the at least one fluid channel passes through at least one of the first O-ring and the second O-ring.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
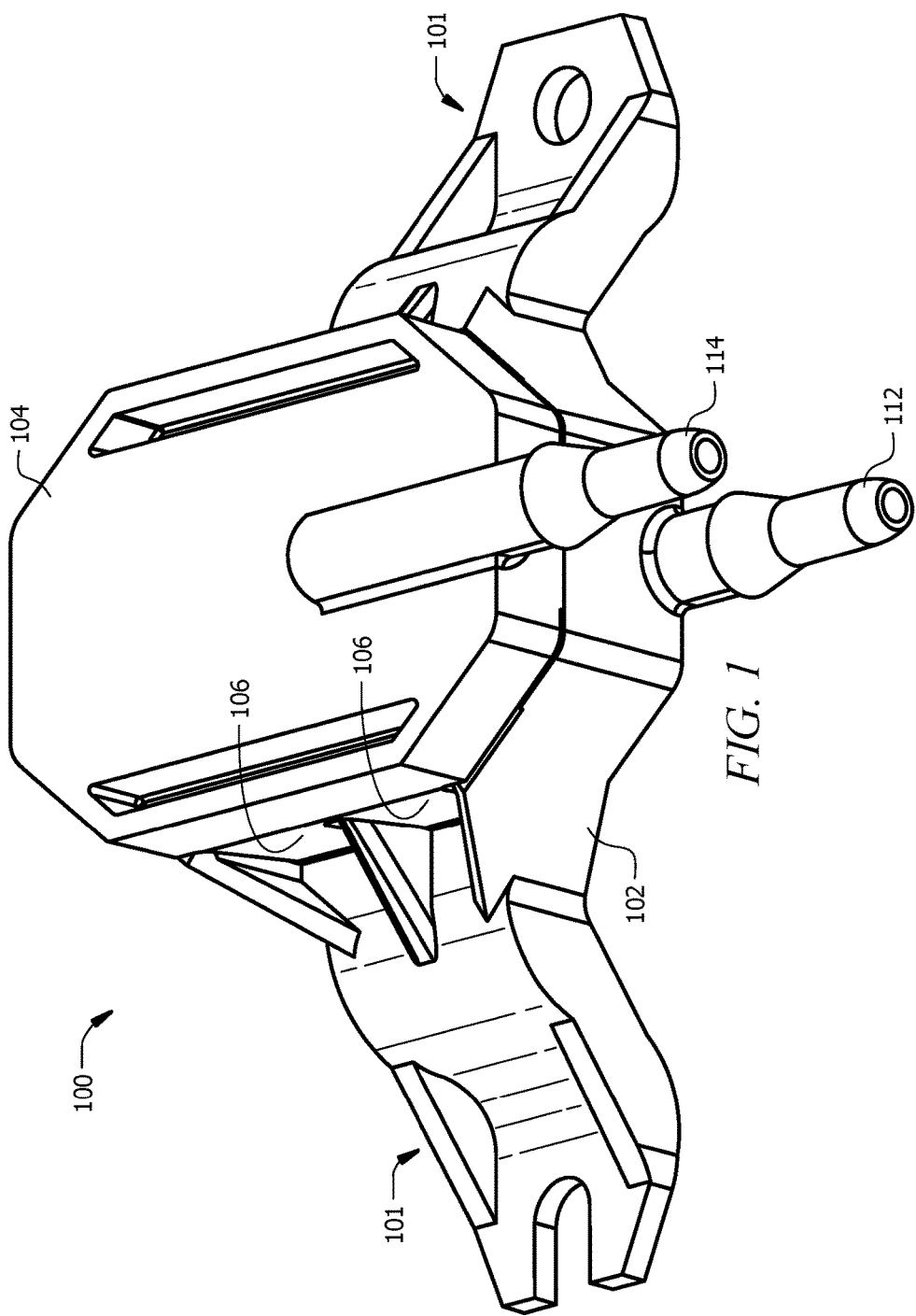
FIG. 1 illustrates a perspective view of a sensor assembly according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for pressure detection, and protecting a pressure sensor within a housing. The sensor assembly described herein may comprise sealing the sensor within the housing between two compressible O-rings, where the sensor is held in equal and opposite forces applied to two opposite sides of the sensor. This method of assembly may protect the sensor from decreased performance caused by stress from the housing. The sensor may be floating between the two O-rings without vertically contacting the housing, such that the housing does not apply any stress to the sensor, especially due to changes in temperature and/or vibrations.

The sensor may comprise one or more openings, or input ports, where the O-rings seal around the input ports, creating a fluid channel. The housing may comprise a "gland" or recess for holding the O-ring in place, where the gland may be sized so that it does not contact the sensor. The O-rings may be compressed between the housing and the sensor, to provide a seal against the housing and the sensor, and the housing may comprise an attachment for maintaining the compression. As an example, the housing may comprise two pieces that snap fit together, compressing the O-rings against the sensor. The snaps may allow for easy assembly of the housing, and may provide sufficient strength to maintain the compression force on the O-rings.

FIG. 1 illustrates an exemplary embodiment of a sensor assembly 100 comprising a first housing 102 and a second housing 104. In some embodiments, the first housing 102 may be a bottom or lower housing. In some embodiments, the second housing 104 may be a top or upper housing. The second housing 104 may comprise snaps (or clips) 106 configured to fit onto the first housing 102. The first housing 102 may comprise an input 112. The second housing 104 may also comprise an input 114. The inputs 112 and 114 may be in fluid communication with a sensor inside the sensor assembly 100. The first housing 102 may comprise one or more mounting elements 101, enabling the sensor assembly 100 to be attached to another instrument or device.

Figure 2:
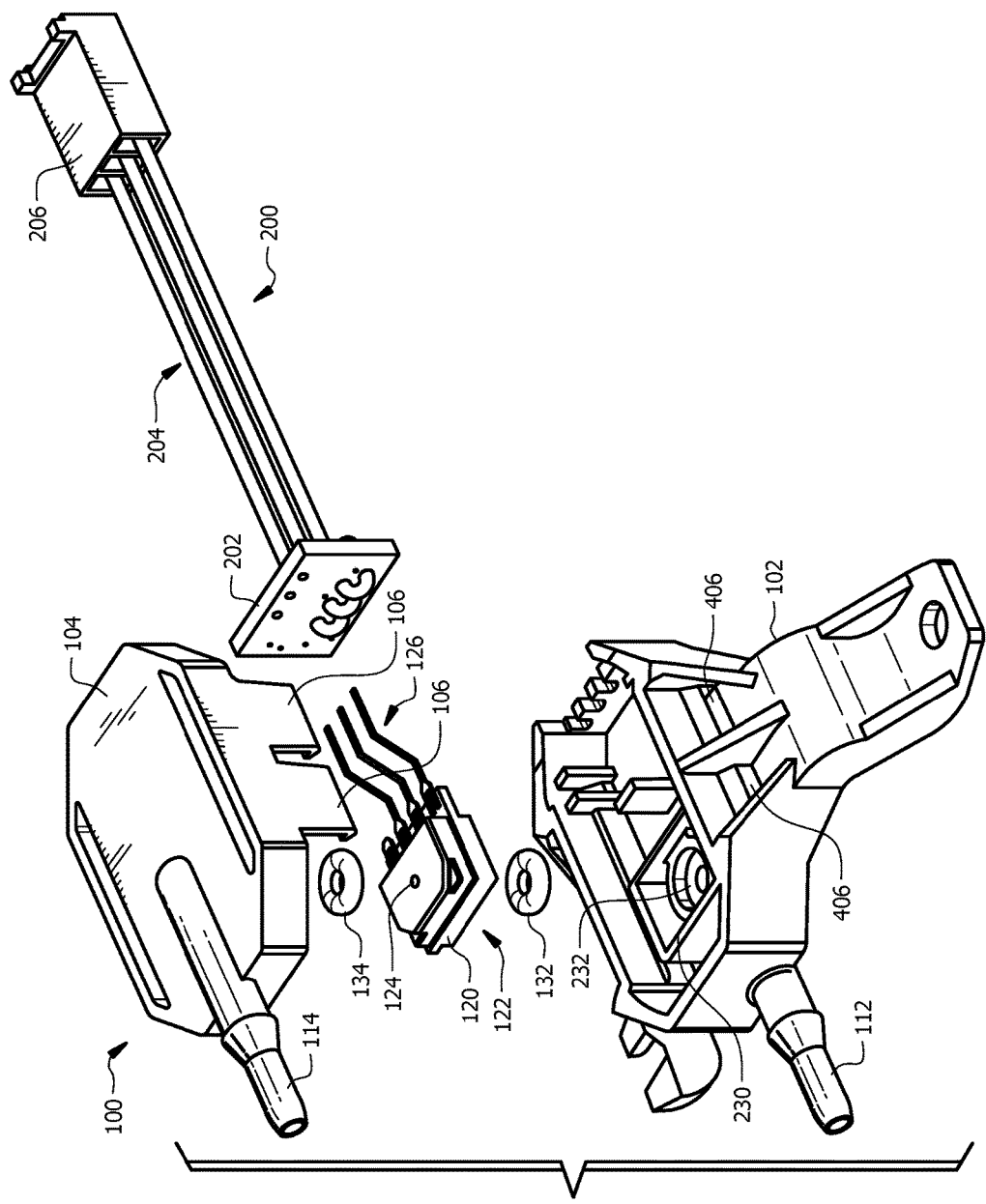
FIG. 2 illustrates an exploded view of a sensor assembly according to an embodiment of the disclosure.

FIG. 2 illustrates an exploded view of the sensor assembly 100. The sensor assembly 100 may comprise a sensor 120 configured to be held within the housings 102 and 104. In some embodiments, the sensor 120 may comprise a pressure sensor with one or more inputs. The sensor assembly 100 may comprise at least one O-ring 132 located between the sensor 120 and the first housing 102. The O-ring 132 may surround an opening 122 of the sensor 120. When the sensor assembly 100 is assembled, the opening 122 may be in fluid communication with the input 112 of the first housing 102. The sensor 100 may comprise an O-ring 134 located between the sensor 120 and the second housing 104. The O-ring 134 may surround an opening 124 of the sensor 120. When the sensor assembly 100 is assembled, the opening 124 may be in fluid communication with the input 114 of the second housing 104. The sensor 120 may be configured to detect pressure via the inputs 112 and 114, wherein the inputs 112 and 114 may be attached to one or more instruments or devices. In some embodiments, hoses may attach over the inputs 112 and 114, where the hoses are in fluid communication with a device of which the pressure is desired to be measured or monitored.

In some embodiments, the sensor 120 may comprise one or more leads 126 configured to attach to a printed circuit board (PCB) 202, where the leads 126 may communicate information to and from the PCB 202 and sensor 120. Additionally, the PCB 202 may be a part of a harness assembly 200, comprising one or more wires 204 and a connector 206. The harness assembly 200 may comprise any number of configurations with any number of wires 204 and/or connectors 206. In some embodiments, the connector 206 may comprise an amp housing, an amp connector, a contact, or another similar element. The connector 206 may be configured to connect the PCB 202 to an exterior device, wherein information may be communicated from the PCB 202. The connector 206 may be configured to provide power to the harness assembly 200.

The first housing 102 may comprise one or more ridges 406 configured to interface with the snaps 106 of the second housing 104. The ridges 406 may comprise an extended portion of the material of the first housing 102. Additionally the ridges 406 may be located adjacent to openings in the first housing 102, allowing the snaps 106 to fit below the ridges 406.

The first housing 102 may comprise a gland 232 (or recess) shaped to receive the O-ring 132. In some embodiments, the second housing 104 may comprise a similar gland (shown below). Additionally, the first housing 102 may comprise one or more walls 230 shaped to fit around the sensor 120. In some embodiments, the second housing 104 may comprise one or more similar walls (shown below).

Figure 3:
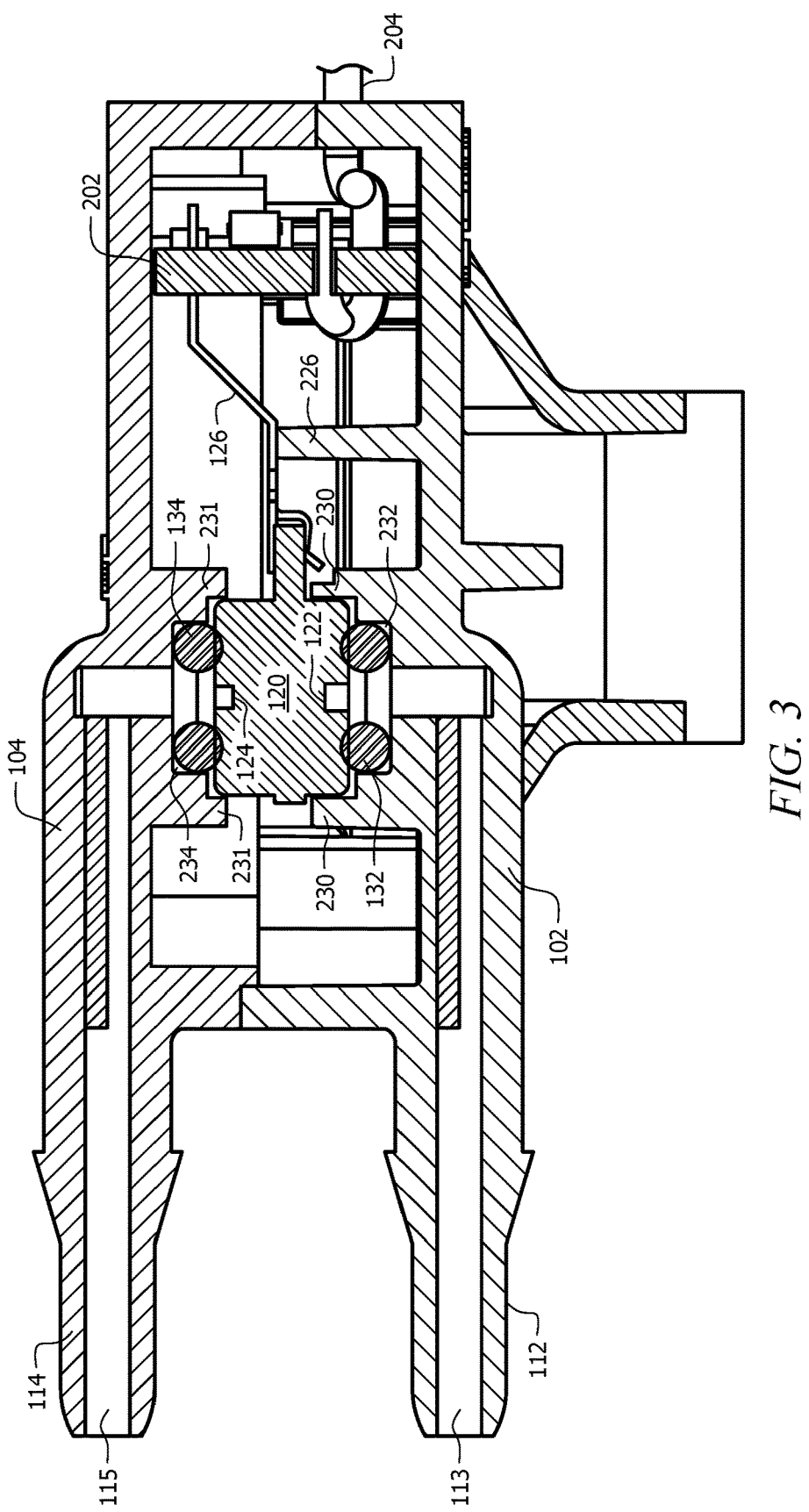
FIG. 3 illustrates a cross-sectional view of a sensor assembly according to an embodiment of the disclosure.

Referring now to FIG. 3, a cross-sectional view of the sensor assembly 100 is shown. As described above, the first housing 102 may comprise an input 112, and the input 112 may comprise a fluid channel 113 through the input 112 leading to the sensor 120. The fluid channel 113 may be in fluid communication with an opening 122 of the sensor 120. Similarly, the second housing 104 may comprise an input 114, and the input 114 may comprise a fluid channel 115 through the input 114 leading to the sensor 120. The fluid channel 115 may be in fluid communication with an opening 124 of the sensor 120.

As described above, the first housing 102 may comprise a gland 232 configured to hold the O-ring 132 in place within the sensor assembly 100. Similarly, the second housing 104 may comprise a gland 234 configured to hold the O-ring 134 in place within the sensor assembly 100. The O-rings 132 and 134 may be compressed between the surfaces of the sensor 120 and the surfaces of the glands 132 and 134. The O-rings 132 and 134 may seal with the sensor 120 to isolate the openings 122 and 124 of the sensor 120 from the rest of the interior of the sensor assembly 100.

As described above, the first housing 102 may comprise one or more walls 230 configured to hold the sensor 120 in place within the sensor assembly 100. Similarly, the second housing 104 may comprise one or more walls 231 configured to hold the sensor 120 in place within the sensor assembly 100. In some embodiments, the walls 230 and/or 231 may form a shape similar to that of the sensor 100. In some embodiments, the walls 230 and/or 231 may not extend the full height of the sensor 100.

The first housing 102 may comprise a support element 226 configured to support the leads 126 extending from the sensor 120 to the PCB 202. In some embodiments, the PBB 202 may be located within the cavity formed by the first housing 102 and the second housing 104. In some embodiments, the wires 204 may extend through the first housing 102 and/or second housing 104.

Figure 4:
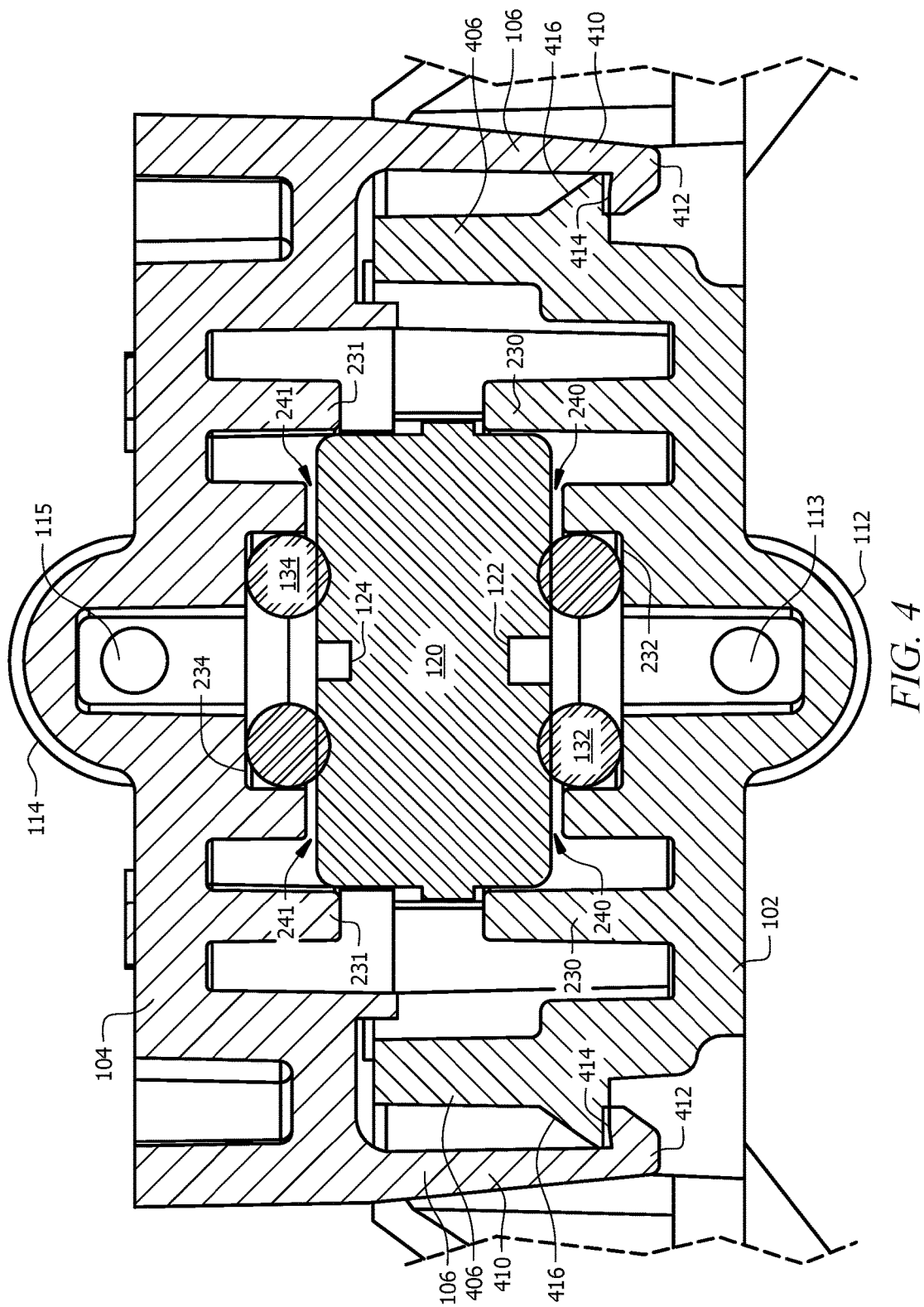
FIG. 4 illustrates another cross-sectional view of a sensor assembly according to an embodiment of the disclosure.

Referring now to FIG. 4, another cross-sectional view of the sensor assembly 100 is shown, where the cross-section of FIG. 4 is perpendicular to the cross-section of FIG. 3. The sensor 120 is located between the two O-rings 132 and 134 to provide a seal with the first housing 102 and second housing 104. The sensor 120 may be floating between the O-rings 132 and 134, with no vertical contact between the sensor 120 and the housings 102 and 104.

In other words, the walls 230 and 231 of may prevent horizontal movement of the sensor 120 within the housings 102 and 104, but there may exist a gap 240 and 241 around the sensor 120 such that the sensor 120 may be held in place vertically by only the O-rings 132 and 134. This may allow the O-rings 132 and 134 to absorb, compress, and compensate for vibrations and other movements that may affect the sensor 120. If the gap 240 and 241 must be sized to retain the O-rings 132 and 134 within the glands 232 and 234, while preventing contact between the sensor 120 and the housings 102 and 104. If the gap 240 and 241 is too large, the O-ring(s) 132 and 134 may push out of gland(s) 232 and 234 at high pressures. If the gap 240 and 241 is too small, the sensor 120 may contact the gland(s) 232 and 234, causing high stress on the sensor 120. For the sensor assembly 100 to function under higher pressures, the O-ring material may be a harder material and/or the gap 240 and 241 may be decreased.

The overlap between the O-rings 132 and 134 and the sensor 120 shown in FIGS. 3 and 4 indicates the distance that the O-rings 132 and 134 will be compressed. The snaps 106 lock with the ridges 406 to counter the compression force of the O-ring, and hold a minimum compression percentage on the O-ring. The minimum compression percentage may be determined based on the material of the O-rings, as well as the expected pressures on the sensor assembly 100.

To ensure that optimal O-ring compression is achieved, to ensure that the O-rings are not damaged, and to adjust the compression on the O-rings, one or more variables may be adjusted, such as the size of the O-rings, the depth of the glands, and/or the position of the snaps and/or ridges. The gland depth may be approximately 10% to approximately 40% of the uncompressed O-ring thickness. The compression force from the O-rings on the sensor may cause negligible output shift from the sensor. As an example, a soft material may be used to form the O-rings, so that the O-rings do not impart too much force to the sensor, and provide a seal with the sensor. The material of the O-rings may also be chosen based on the expected temperature range.

The snaps 106 may comprise a number of features that allow for sufficient holding of the compressed O-rings. The over-travel of the snap 106 allows the snap 106 to travel past the ridge 406 to mate with the ridge 406, and the over-travel creates a snap pre-load that can reduce variation in the O-ring compression if combined with a hard stop between the snap 106 and the ridge 406. This movement requires flexibility in the snap 106 (such as the arm 410 and/or base 412) and possibly a fixture 416 to contact the snap 106 and direct the over-travel of the snap 106. The undercut 414 of the snap 106 prevents the snap 106 from creeping and loosening over time. The retaining force of the snap 106 should be significantly higher than the O-ring compression force, to provide a large factor of safety for retaining the O-ring compression. The strength of the snap (between the snap 106 and the ridge 406) may be adjusted based on the application. When the snaps 106 are assembled only once, the snap strength may be very high because the snaps do not need to be removed.

Embodiments of the disclosure may comprise a method of assembling a sensor assembly. A sensor block may be provided, wherein the sensor block comprises one or more openings for detecting pressure. Leads (or terminals) may be attached to the sensor block. The leads may be bent and/or trimmed. A first housing may be formed (possibly via molding) comprising a gland for receiving an O-ring. A first O-ring may be placed within the first housing. Then, the sensor block may be placed within the first housing, contacting the first O-ring.

A PCB, wire harness assembly may be attached to the first housing. Additionally, the PCB may be attached to the leads of the sensor via soldering. A second housing may be formed (possibly via molding) comprising a gland for receiving an O-ring, and comprising one or more snaps. A second O-ring may be placed within the second housing. The second housing may be attached to the first housing, encapsulating the sensor, wherein the second O-ring contacts the sensor. The second housing may attach to the first housing via the snaps. The assembled sensor assembly may be tested before used, such as with leak testing.

In a first embodiment, a sensor assembly may comprise a sensor having at least one pressure input port; a first housing configured to encapsulate the sensor; a second housing configured to attach to the first housing to encapsulate the sensor; a first O-ring located between the first housing and the sensor; a second O-ring located between the second housing and the sensor; and a printed circuit board configured to receive detected pressure information from the sensor.

A second embodiment can include the sensor assembly of the first embodiment, wherein the second housing comprises one or more snaps configured to mate with one or more ridges on the first housing.

A third embodiment can include the sensor assembly of the second embodiment, wherein at least one snap is located in the same plane as the sensor.

A fourth embodiment can include the sensor assembly of any of the first to third embodiments, wherein the first O-ring is compressed between the first housing and the sensor, and wherein second O-ring is compressed between the second housing and the sensor.

A fifth embodiment can include the sensor assembly of the fourth embodiment, wherein the compression is applied by an attachment between the first housing and the second housing.

A sixth embodiment can include the sensor assembly of any of the first to fifth embodiments, wherein the sensor is configured to float between the first and second O-rings without vertically contacting the first or second housing.

A seventh embodiment can include the sensor assembly of any of the first to sixth embodiments, wherein the first housing comprises walls configured to retain the sensor from horizontal movement.

A eighth embodiment can include the sensor assembly of any of the first to seventh embodiments, wherein the second housing comprises walls configured to retain the sensor from horizontal movement.

A ninth embodiment can include the sensor assembly of any of the first to eighth embodiments, further comprising at least one fluid channel in fluid communication with the at least one pressure input port.

A tenth embodiment can include the sensor assembly of any of the first to ninth embodiments, wherein the sensor comprising two input ports, wherein the first O-ring surrounds a first input port, and wherein the second O-ring surrounds a second input port.

A eleventh embodiment can include the sensor assembly of any of the first to tenth embodiments, further comprising a first input incorporated into the first housing, wherein the first input is in fluid communication with the first input port of the sensor.

A twelfth embodiment can include the sensor assembly of any of the first to eleventh embodiments, further comprising a second input incorporated into the second housing, wherein the second input is in fluid communication with the second input port of the sensor.

In a thirteenth embodiment, a method for assembling a pressure sensor, the method comprising providing a sensor comprising at least one input port for detecting pressure; placing the sensor within a first housing, wherein the first housing comprises a first O-ring, and wherein the sensor contacts the first O-ring; attaching a second housing to the first housing, thereby encapsulating the sensor, wherein the second housing comprises a second O-ring, and wherein the sensor contacts the second O-ring; and directing a pressure to be detected toward the at least one input port via a fluid channel, wherein the fluid channel to the input port passes through at least one of the first O-ring and the second O-ring.

A fourteenth embodiment can include the method of the thirteenth embodiment, wherein attaching the second housing to the first housing comprises attaching one or more snaps of the second housing to one or more ridges of the first housing.

A fifteenth embodiment can include the method of the thirteenth or fourteenth embodiments, further comprising compressing the first O-ring and the second O-ring via the attachment between the first housing and the second housing.

A sixteenth embodiment can include the method of any of the thirteenth to fifteenth embodiments, wherein the sensor comprises a first input port and a second input port, wherein the first O-ring surround the first input port, and wherein the second O-ring surrounds the second input port.

A seventeenth embodiment can include the method of any of the thirteenth to sixteenth embodiments, further comprising attaching one or more leads to the sensor; and attaching the one or more leads to a printed circuit board assembly.

In a eighteenth embodiment, a sensor assembly may comprise a sensor having at least one pressure input port; at least one housing configured to encapsulate the sensor; a first O-ring configured to be compressed between the housing and the sensor; a second O-ring configured to be compressed between the housing and the sensor, wherein the sensor floats between the first O-ring and the second O-ring; and at least one fluid channel passing through the housing to the at least one pressure input port, wherein the at least one fluid channel passes through at least one of the first O-ring and the second O-ring.

A nineteenth embodiment can include the sensor assembly of the eighteenth embodiment, further comprising a first fluid channel passing through the housing to a first pressure input port, wherein the first fluid channel passes through the first O-ring; and a second fluid channel passing through the housing to a second pressure input port, wherein the second fluid channel passes through the second O-ring.

A twentieth embodiment can include the sensor assembly of the eighteenth or nineteenth embodiments, wherein the at least one housing comprises walls configured to horizontally retain the sensor within the housing.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A sensor assembly comprising:
   a sensor having a sensor housing with at least one pressure input port;
   a first housing;
   a second housing configured to attach to the first housing, wherein the first housing and the second housing are configured to house the sensor;
   a first O-ring located between the first housing and a first side of the sensor housing;
   a second O-ring located between the second housing and a second opposing side of the sensor housing;
   wherein the first O-ring and the second O-ring are configured to provide a cushion in a first direction between the first and second housings and the sensor housing to reduce stress applied by the first and/or second housings to the sensor housing; and a printed circuit board configured to receive detected pressure information from the sensor.

2. The sensor assembly of claim 1, wherein the second housing comprises one or more snaps configured to mate with one or more ridges on the first housing.

3. The sensor assembly of claim 2, wherein at least one snap is located in the same plane as the sensor.

4. The sensor assembly of claim 1, wherein the first O-ring is compressed between the first housing and the first side of the sensor housing, and wherein second O-ring is compressed between the second housing and the second opposing side of the sensor housing.

5. The sensor assembly of claim 4, wherein the compression is applied by an attachment between the first housing and the second housing.

6. The sensor assembly of claim 1, wherein the sensor housing is configured to float between the first and second O-rings without contacting the first or second housing in the first direction.

7. The sensor assembly of claim 1, wherein the first housing comprises walls configured to constrain the sensor housing from movement in a second direction perpendicular to the first direction.

8. The sensor assembly of claim 1, wherein the second housing comprises walls configured to constrain the sensor housing from movement in a second direction perpendicular to the first direction.

9. The sensor assembly of claim 1, further comprising at least one fluid channel in fluid communication with the at least one pressure input port.

10. The sensor assembly of claim 1, wherein the sensor housing comprising two input ports, wherein the first O-ring surrounds a first input port, and wherein the second O-ring surrounds a second input port.

11. The sensor assembly of claim 10, further comprising a first input incorporated into the first housing, wherein the first input is in fluid communication with the first input port of the sensor housing.

12. The sensor assembly of claim 10, further comprising a second input incorporated into the second housing, wherein the second input is in fluid communication with the second input port of the sensor housing.

13. A method for assembling a pressure sensor, the method comprising:

providing a sensor comprising a sensor housing with at least one input port for detecting pressure;

placing the sensor within a first housing, wherein the first housing comprises a first O-ring, and wherein the sensor housing contacts the first O-ring;

attaching a second housing to the first housing, thereby encapsulating the sensor housing, wherein the second housing comprises a second O-ring, and wherein the sensor housing contacts the second O-ring;

wherein the first O-ring and the second O-ring provide a cushion and help isolate the sensor housing in at least one direction from stress exerted by one or both of the first housing and the second housing; and directing a pressure to be detected toward the at least one input port of the sensor housing via a fluid channel, wherein the fluid channel passes through at least one of the first O-ring and the second O-ring.

14. The method of claim 13, wherein attaching the second housing to the first housing comprises attaching one or more snaps of the second housing to one or more ridges of the first housing.

15. The method of claim 13, further comprising compressing the first O-ring and the second O-ring via the attachment between the first housing and the second housing.

16. The method of claim 13, wherein the sensor housing comprises a first input port and a second input port, wherein the first O-ring surrounds the first input port, and wherein the second O-ring surrounds the second input port.

17. The method of claim 13, further comprising attaching one or more leads to the sensor; and attaching the one or more leads to a printed circuit board assembly.

18. A sensor assembly comprising:

a sensor having a sensor housing with at least one pressure input port;

at least one housing configured to house the sensor housing;

a first O-ring configured to be compressed between the housing and the sensor housing;

a second O-ring configured to be compressed between the housing and the sensor housing, wherein the sensor housing floats between the first O-ring and the second O-ring and is cushioned from stress exerted by the housing in at least one direction; and at least one fluid channel passing through the housing to the at least one pressure input port of the sensor housing, wherein the at least one fluid channel passes through at least one of the first O-ring and the second O-ring.

19. The sensor assembly of claim 18, further comprising:

a first fluid channel passing through the housing to a first pressure input port of the sensor housing, wherein the first fluid channel passes through the first O-ring; and a second fluid channel passing through the housing to a second pressure input port of the sensor housing, wherein the second fluid channel passes through the second O-ring.

20. The sensor assembly of claim 18, wherein the at least one housing comprises walls configured to constrain the sensor housing within the housing in at least one direction.

* * * * *